Dec. 23, 1941.   G. M. CROFT   2,266,959
GAS DEHYDRATION
Filed May 14, 1940
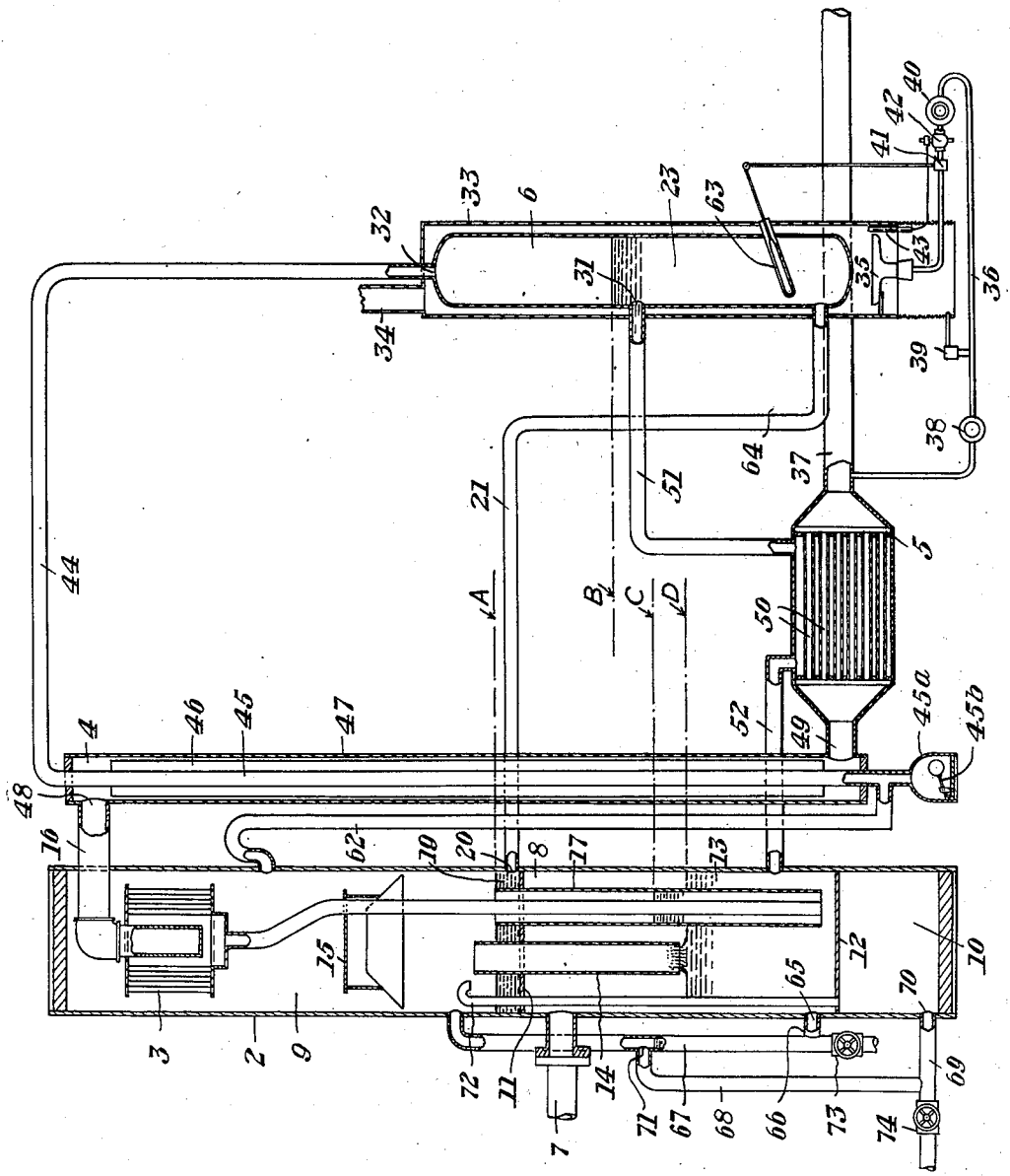
INVENTOR
George M. Croft
By Stebbins, Blenko
& Parmelee
Attorneys Patented Dec. 23, 1941

2,266,959

UNITED STATES PATENT OFFICE 2,266,959

GAS DEHYDRATION

George M. Croft, Pittsburgh, Pa., assignor to Blaw-Knox Company, Pittsburgh, Pa., a corporation of New Jersey Application May 14, 1940, Serial No. 335,090

4 Claims. (Cl. 261—3)

The present invention relates generally to the dehydration of gas. It is particularly applicable to the extraction of moisture from natural gas and will be described herein as applied to this use. However, as the description proceeds it will be apparent that it can be applied to other dehydrating and gas treating operations.

Apparatus used heretofore for the extraction of moisture from natural gas required frequent attention. Such apparatus had to be adjusted and generally serviced regularly and the dehydrating chemicals replaced. Furthermore, such apparatus as has been used heretofore has required some form of power other than that obtainable conveniently from the gas itself. As will be readily appreciated, these limitations render such apparatus very poorly suited for installation at remote locations where frequent servicing is considered impracticable or where some form of power other than that derivable from the gas is not available. For example, dehydration equipment of the character heretofore available is quite poorly suited to installations at the well-head which is usually located at some remote point or where power other than that derivable from the gas itself is not available.

The present invention provides a method and apparatus whereby these limitations or difficulties are overcome. The apparatus which I provide is relatively simple in construction, embodies relatively few moving parts, is self-regulating after proper installation adjustments are made, and derives all of its operating power from the gas itself.

In accordance with the present invention the gas first enters a contacting unit in which it is brought into intimate contact with a suitable dehydrating liquid such as brine. The brine absorbs water from the gas and, consequently, it is necessary to reconcentrate the brine regularly. Some of the dilute brine is withdrawn from the contactor and circulated to a reconcentrating boiler where heat is applied for driving off the water taken up by the brine in the contactor. The reconcentrated brine is then passed through a heat exchanger where it is cooled and it then passes back to the contactor. The gas or vapor driven from the brine in the reconcentrating boiler passes through a condenser and the water is condensed and withdrawn from the system. The cleaned and dehydrated gas is used for cooling the vapors driven off by the boiler. It may be used also to cool the reconcentrated brine which passes through the heat exchanger, but this may be unnecessary in many cases. The treated gas which is discharged from the contactor passes into a casing surrounding the condenser for cooling the vapor and it then passes into the heat exchanger for cooling the reconcentrated brine. This gas then passes into the discharge line and is discharged from the dehydrating apparatus.

The flow of the dilute brine from the contactor to the reconcentrating boiler and the flow of the reconcentrated brine from the boiler back to the contactor takes place by gravity. Friction in pipes is sufficient to restrict this flow as much as needed, in most cases. In exceptional cases regulating orifices may be used. In the preferred embodiment described more in detail hereinafter, the regulation of the brine concentration is effected by regulating the temperature of the brine in the boiler. If the temperature of the brine in the boiler is below a definite point, heat is automatically applied to the boiler for effecting a reconcentration of the brine solution.

It will be apparent from what has been stated that no source of power other than the gas itself is required in the carrying out of my method or in the operation of the apparatus which I provide. The gas itself is used for condensing the vapors, for cooling the reconcentrated brine, and for heating the brine in the reconcentrating boiler.

In the accompanying drawing I have shown for purposes of illustration only a preferred embodiment of the present invention. This drawing is somewhat diagrammatic as all of the parts are shown in a single plane. It will be understood, of course, that in practicing the invention the various portions of the apparatus will be grouped compactly into an assembly of such character that it can all be supported on a common base and if desired enclosed in a single housing for protection against weather and tampering. It will also preferably be arranged so that a minimum of piping will be required.

The apparatus shown in the drawing comprises the contactor 2, a separator 3, a condenser 4, a heat exchanger 5, a reconcentrating boiler 6, and the connections and operating equipment described in detail hereinafter.

The gas to be dehydrated enters the contactor 2 through the inlet 7. The contactor is divided into a reservoir chamber 8, an upper chamber 9, and an overflow chamber 10 by means of horizontally extending plates 11 and 12. The gas entering through the inlet 7 passes into the reservoir chamber 8 which has in it a pool 13 of brine or some other suitable hygroscopic liquid capable of dehydrating the gas. The gas is brought into intimate contact with the brine in this pool and in the contactor tube 14 which passes through the plate 11 and extends downwardly to approximately the normal level of the pool of brine in the contactor. This portion of the apparatus is preferably constructed in the manner shown in Sillers Patent No. 2,048,145. However, a multistage variation of the Sillers device, such as is shown in the Chandler Patent No. 2,048,179, may be used. Also any other suitable gas and liquid contacting apparatus in which the liquid is recovered from the gas at a higher elevation and returned to the main supply by gravity may be used.

In the device shown in the drawing the gas and some of the brine pass upwardly through the contactor tube 14 into the upper chamber 9. The contactor tube 14 extends some distance above the plate 11 so that the precipitated brine will not flow downwardly through it to the pool in the reservoir chamber. The brine spray passing upwardly through the contactor tube into the upper chamber 9 is precipitated and collected on the horizontally extending plate 11. The gas passes upwardly through chamber 9, past a knockdown baffle 15 and then through a separator 3 to remove liquid droplets, which is shown as of the type disclosed in Bradshaw Patent No. 1,761,177, although any other type may be used. The gas then passes out of the contactor through the discharge pipe 16.

Some of the brine which is deposited on the plate 11 is returned to the pool 13 by means of a return tube 17 which extends through the plate 11 and downwardly to a point near the bottom of the pool 13. This return tube 17 extends above the plate 11 so that some of the diluted brine remains thereon until it is circulated for reconcentration.

If the brine employed is maintained at substantially uniform saturation and temperature and the pressures remain substantially constant in the contactor and if other conditions of operation are normal the gas emerging from the contactor will have a substantially uniform moisture content. However, since the brine absorbs moisture from the gas, means must be provided to remove moisture from the brine in order to maintain the concentration constant.

The diluted brine in the upper chamber 14 collects in the pool 19, the depth of which is limited by the top of the return tube 17. The depth of the pool is made such as to submerge the outlet 20 so that brine may flow through the outlet and through the pipe 21 into the pool 23 in the reconcentrator boiler 6 near the base thereof. This flow of brine from the upper chamber 9 of the contactor into the boiler 6 is by gravity.

The boiler 6 is provided with an outlet 31 in a side wall, the outlet being positioned below the level of the pool 23. It is also provided with a vapor outlet 32 through which the vapors which are driven off during the reconcentration operation escape from the boiler. An insulating covering 33 is placed around the boiler 6 to insulate it against excessive escape of heat and this cover is provided with a vent 34 to permit the escape of products of combustion. A burner 35 is positioned in the insulated cover beneath the boiler 6 to supply the necessary heat to the boiler for effecting the reconcentration of the brine solution. This burner may be any suitable gas burner. Gas is fed to the burner through the pipe line 36 which is connected to the gas discharge line 37. A high pressure reducing valve 38 is embodied in the line 36 in order to reduce the gas pressure from that prevailing in the line 37, which is normally 500 to 1000 pounds per square inch or more, to normal pressure such as approximately 20 pounds per square inch. A gas pressure safety valve 39 and a low pressure gas regulator 40 are also embodied in the line 36. This line is also provided with a thermostatically operated valve 41 and a valve 42 adapted to bleed off a small amount of gas to be fed to the safety pilot 43.

The vapors that are driven off in the reconcentrator 6 pass through the outlet 32 and through the pipe line 44 to the condenser 4. The condenser is provided with a condensing tube 45 which has fins 46 thereon. The condenser tube is encased in the condenser casing 47. Adjacent its upper end this casing is in communication with the line 16 through which the gas is discharged from the contactor. The gas entering the condenser casing 47 through the inlet 48 passes downwardly along the condenser tube and is discharged from it through a pipe 49 into the heat exchanger 5. The gas passes through the spaced tubes 50 of the heat exchanger and is discharged therefrom into the discharge outlet 37. During its passage through the condenser the gas cools the vapors driven off in the reconcentration of the brine solution, and during its passage through the heat exchanger the gas cools the reconcentrated brine. Within the pipe 45 the hot gas and water vapor are cooled, the water condensing to the liquid form, and dripping into a collecting chamber 45a whence it is discharged by a float valve 45b. These parts constitute an ordinary high pressure steam trap. The gas does not escape, but passes up through the pipe 62. In fact, the gas has free communication from the space 6 above the liquid in the boiler, to the space 9 above the contactor.

The reconcentrated brine is discharged from the boiler 6 through the outlet 31 and passes through the line 51 into the heat exchanger where it circulates about the tubes 50. It is then discharged from the heat exchanger through the line 52 and is discharged into the reservoir of the contactor. The line 52 connects with the reservoir below the normal level of the liquid therein.

When the apparatus is in operation, the liquid in the various chambers stands at the four different levels designated on the drawing as levels A, B, C and D. Liquid in the chamber 9 normally stands at level A which is the elevation of the upper end of the return tube 17. Level D is the surface of the pool 13 in the chamber 8. Liquid in the return tube 17 stands at level C which is somewhat above level D. The difference between level C and level D is determined by the pressure drop in the gas passing from the reservoir through the contactor tube 14 into the precipitation chamber 9. The level B which is the level of the liquid in the boiler 6 is between the levels C and A. The pressures in the precipitation chamber 9 and in the boiler 6 are equalized through the vent pipe 62, the condenser tube 45 and the pipe 44. The upper end of the vent pipe 62 communicates with the precipitation chamber 9 and the other end thereof communicates with the condenser tube 45 near the lower end thereof.

The operation of the burner 35 for heating and hence reconcentrating the brine in the boiler 6 is controlled by a thermostat 63 which controls the operation of the regulating valve 41. This thermostat and regulating valve are adjusted to turn off the burner when the temperature of the brine exceeds that desired to secure the desired concentration of the particular brine used at the operating pressure, and to turn on the burner when the temperature of the brine in the boiler falls below such temperature.

In referring to "boiling point of the brine of maximum desired concentration" I do not refer to the temperature at which the brine would boil were there no gas dissolved in it, but to the temperature which is necessary to maintain the desired concentration in the presence of gas. The gas dissolved in the liquid during the contacting step escapes at a lower temperature than that at which the brine would boil were no gas in it; and in escaping it carries with it water vapor that would not escape at that temperature were no gas present. In practice the thermostat is set at whatever temperature is found necessary to secure the desired brine concentration.

The apparatus is not limited to any particular gas pressure, but the gas pressure usually is very much greater than atmospheric pressure. The gas pressure in the boiler is substantially the same as in the contactor, but the temperature in the boiler is higher than in the contactor. Under these conditions, when the pressure is high, considerable gas is dissolved in the liquid during the contacting operation and liberated therefrom in the boiler. The gas thus liberated in the boiler carries with it moisture from the brine. This action is known as "stripping" and may occur at lower temperature than the boiling point of the brine when no gas other than steam is evolved.

In actual use of this apparatus, with ordinary natural gas and certain brine solutions used commercially, it has been found that at 500 pounds gas pressure, the removal of water occurred with sufficient rapidity to maintain the desired brine concentration, at a boiler temperature of about 180 degrees Fahrenheit, although the boiling point of the same brine at atmospheric pressure was about 265 degrees Fahrenheit.

Thus, this invention makes use of the high gas pressure to assist in maintaining brine concentration without employing high temperatures. It is important, not merely incidental to the invention, that all the chambers shall be under substantially the same pressure, regardless of the means employed for circulating the dehydrating liquid.

The invention in its most complete form contemplates using the gas flow to circulate the liquid, but this feature of assisting the reconcentration of brine by stripping is not dependent upon any particular method of circulating brine. A pump could be used for that purpose so far as this feature is concerned.

As is well-known in this art, the boiling point of a suitable brine solution at any given pressure increases as the concentration of the solution increases. Regulation of the brine heating in accordance with critical temperatures in the boiler, therefore, constitutes a control in accordance with the specific gravity of the brine. Various other methods may be utilized to control the operation of devices of this character in accordance with the specific gravity of the brine and it will be understood that the present invention is not limited to control in accordance with critical temperatures by means of thermostats or the like.

As has been pointed out above, the dehydrated and cleaned gas delivered from the contactor passes through the casing of the condenser and the tubes of the heat exchanger to absorb heat from the vapors and brine, respectively, cooled in these devices. This is a distinct advantage over the prior art constructions as it has heretofore been customary to cool the brine and vapors by circulating water through cooling tubes or jackets which requires additional equipment, such as tanks, piping, pumps, motors, etc.

Although it is preferable to cool both the condenser and the heat exchanger by the circulation of gas, if desired the condenser may be atmospherically cooled and the gas flow used to cool only the brine flowing through the heat exchanger 5. Since the water content of the gas before treatment is a very small percentage of the gas, the removal of the water in the contactor produces dilute brine which has to be reconcentrated in the boiler at a relatively small rate. The gas flow in the condenser and the heat exchanger is very large compared with the vapor and fluid flow in these respective units and the gas is therefore warmed only a small amount whie the vapor and brine are cooled to a considerable extent. Under conditions normally encountered the gas flow is quite adequate to provide the desired cooling of both the vapors and the reconcentrated brine. In practice, it is found in most cases unnecessary to cool the returning brine before it enters the reservoir, because it is small in amount, and sufficient cooling takes place within the contactor itself. It is necessary, however, to cool the gases passing from the boiler through pipe 44 in order to condense the water which is removed by the steam trap at the bottom of 45.

In order to keep the apparatus small and to secure efficient operation, a relatively high gas velocity through the condenser and the heat exchanger is desirable. In the apparatus shown in the drawing the gas leaving the contactor first enters the condenser and then passes to the heat exchanger. This order is not essential to the process but is desirable as a matter of convenience in connecting the parts of the apparatus together in a satisfactory manner. The practical considerations rendering an arrangement of the character shown in the drawing preferable are that the gas must leave the contactor near the top and be brought to a pipe near the ground, that the condenser is preferably placed vertically so as to insure complete drainage and prevent corrosion, that the heat exchanger should be at a relatively low elevation to permit gravity flow of brine from the boiler to the contactor, and that a minimum amount of connecting pipe and bends in the assembly are required. These various considerations are most satisfactorily met by using a vertical condenser located adjacent the contactor where it can be employed as a part of the apparatus for conveying the gas from the top of the contactor to approximately pipe line elevation.

The warming of the gas brought about by its passage through the condenser and through the heat exchanger is desirable in some cases. It is particularly desirable where the line following the dehydrator is long or passes under streams so that occasional chilling below the dew point might occur. This hazard is lessened when the gas in the line is warmer than has been customary heretofore.

It will be evident from what has been stated above that the apparatus which I provide is entirely self-regulating under normal conditions of gas flow and that when properly proportioned, it will operate continuously without attention for a long period of time. By controlling the brine concentration within operating limits the quantity of liquid will remain approximately constant and level D will be maintained in suitable relation with the bottom of the contactor tube 14 so as to give proper operation. It is desirable, however, to provide some protection against the raising of the level D above some critical elevation at which the contactor becomes inoperative. It will be appreciated that this might occur under exceptional circumstances such, for example, as the extinguishment of the pilot burner 29 or an excessive accumulation of dirt in the bottom of the contactor. In accordance with my invention provision is made to prevent such occurrences.

If the liquid level D in the contactor rises too high for proper operation of the contactor, brine will flow from the pool 13 into the overflow or storage chamber 10. When this condition occurs the brine flows through the outlet 65, the pipe 66, the stand-pipe 67, and the return pipes 68 and 69, the pipe 69 communicating with the overflow chamber 10 through the inlet 70. The stand-pipe 67 is vented to the precipitation chamber 9 through a side wall thereof. The outlet 71 from the stand-pipe 67 to the pipe 68 is slightly above the normal level of the liquid in the return tube 17 of the contactor and if desired it may be made adjustable. The overflow chamber 10 is also vented to the precipitation chamber 9 by the vent pipe 72 so as to equalize the pressures in these two portions of the apparatus. In case of an excessive rise in the level of the pool 13 in the contactor, brine will flow through the outlet 71 and into the chamber 10. This excessive quantity of fluid will remain there until removed at the next servicing of the apparatus. Drain valves 73 and 74 are provided to permit withdrawal of fluid from chambers 8 and 10 of the contactor.

It will be apparent to those skilled in the art that the method and apparatus described above possess many advantages over the prior art and that the apparatus will continue to operate for long periods of time without servicing and without utilizing any power other than that derived from the gas itself. The invention may be practiced in ways other than the preferred method described above and various different types of apparatus may be employed. It may be practiced or embodied within the scope of the appended claims.

I claim:

1. Apparatus for dehydrating gas comprising a contacting chamber adapted to contain a pool of a hygroscopic liquid, a second chamber positioned above and communicating with said contacting chamber, a reconcentrating boiler, means for passing gas into and through said contacting chamber and for discharging it into said second chamber, the flow of gas between said chambers being sufficient to cause the gas to carry liquid in an appreciable amount from the pool in said contacting chamber into said second chamber, means for passing liquid from said second chamber to said reconcentrating boiler by gravity, means for passing liquid from the reconcentrating boiler to the pool in said contacting chamber by gravity, means for evaporating water from the liquid during its passage through the reconcentrating boiler, cooling apparatus for cooling the liquid during its passage from the reconcentrating boiler to the contacting chamber by means of the gas which has passed through the contacting chamber and said second chamber, and means for condensing liquid from the vapors given off during the reconcentrating operation by means of said gas after it has passed through said second chamber.

2. Apparatus for dehydrating gas comprising a contacting chamber adapted to contain a pool of a hygroscopic liquid, means for passing gas under pressure into said chamber, a second chamber communicating with and positioned above said contacting chamber, a reconcentrating boiler, means for passing liquid from the pool in said contacting chamber into said second chamber by the gas flow between said chambers, means for passing liquid from said second chamber to and through said reconcentrating boiler and for returning said liquid to the contacting chamber by gravity, an outlet for discharging gas from said second chamber, means cooperating with said reconcentrating boiler for driving off absorbed water and gases by heat, and means for cooling the reconcentrated liquid during its passage from said boiler to said contacting chamber and for cooling the gas and vapor given off during the reconcentrating operation by dehydrated gas discharged from said second chamber.

3. Apparatus for dehydrating gas comprising a contacting chamber adapted to contain a pool of a hygroscopic liquid, means for passing gas under pressure into said chamber, a second chamber communicating with and positioned above said contacting chamber, a reconcentrating boiler, means for passing liquid from the pool in said contacting chamber into said second chamber by the gas flow between said chambers, means for passing liquid from said second chamber to and through said reconcentrating boiler and for returning said liquid to the contacting chamber by gravity, means cooperating with said reconcentrating boiler for driving off absorbed water and gases by heat, means for cooling the gas and vapor given off during the reconcentrating operation by dehydrated gas discharged from said second chamber, and means for returning the cooled gas to the main body of gas passing through the apparatus.

4. Pressure resisting apparatus for removing moisture from flowing gas under pressure comprising, in combination, a contactor for effecting intimate contact between said gas and a moisture absorbing liquid, said contactor being arranged to provide a lower liquid level and an upper liquid level and having means for conveying liquid from the lower to the upper level by the flow of the gas, an evaporator for the moisture absorbed and the gas dissolved by the liquid in the contactor, means for circulating a portion of the liquid from the contactor to the evaporator and for returning it to the contactor by gravity, independent means for returning the rest of the liquid from the upper level to the lower level in said contactor, a vapor outlet from said evaporator, means for applying heat to the liquid entering the evaporator, means providing communication between the vapor outlet of the evaporator and the gas from the contactor including a condenser for condensing water vapors under pressure, and means for removing condensed water without lowering the gas pressure within said apparatus or depleting the moisture absorbing liquid.

GEORGE M. CROFT.